June 2, 1959  H. F. W. MARUHN  2,888,999
MOTOR VEHICLE TRANSMISSION GEAR BRACING MEANS
Filed May 3, 1955
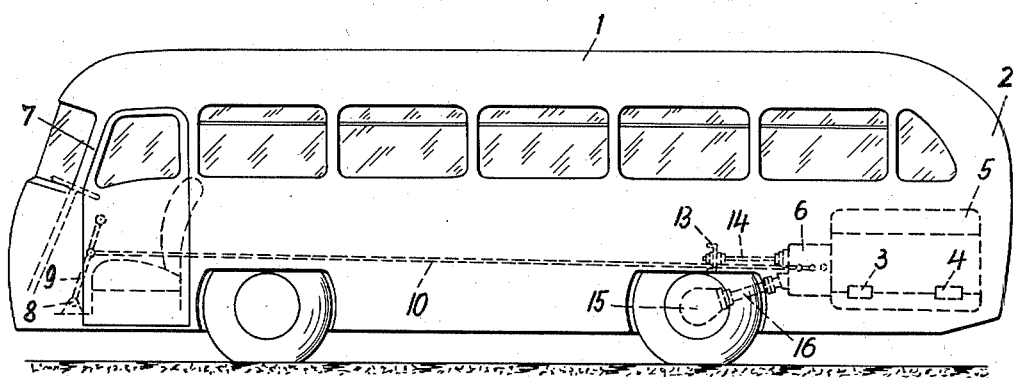
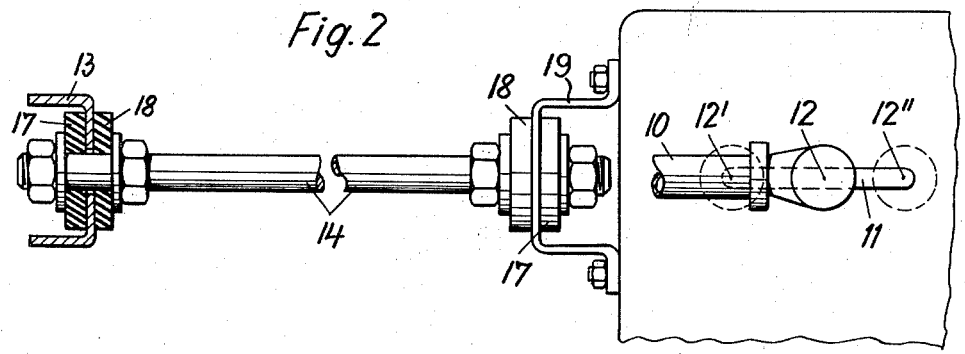
INVENTOR
HERBERT F. W. MARUHN
BY Dicke and Craig
ATTORNEYS.

United States Patent Office 2,888,999
Patented June 2, 1959

2,888,999
MOTOR VEHICLE TRANSMISSION GEAR BRACING MEANS

Herbert F. W. Maruhn, Stuttgart-Uhlbach, Germany, assignor to Daimler-Benz Aktiengesellschaft, Stuttgart-Unterturkheim, Germany Application May 3, 1955, Serial No. 505,764

Claims priority, application Germany May 4, 1954

1 Claim. (Cl. 180—54)

The present invention relates to a gear suspension for motor vehicles wherein the gear shift lever is mounted independently of, and at a point remote from the gear transmission. More particularly, the present invention relates to a gear transmission or a unit combining the engine and transmission which is resiliently suspended in the back of a bus or similar long-extended vehicle, and to the mounting of the gear shift lever located in the front part of the bus and its connection to the gear shift mechanism on the transmission in the back of such vehicle.

In busses and similar long-extended vehicles wherein the engine and gear transmission usually form a single unit which is mounted and resiliently suspended in the rear of the vehicle and in a direction longitudinally thereof so as to eliminate or reduce noise and prevent the transmission of vibrations to the car body, the engine and transmission unit is necessarily subjected to its own vibrations caused by the running of the engine. While driving, such engine unit additionally is subjected to shocks which are transmitted thereto from the rear axle of the vehicle in the direction of the driving shaft. In the practical operation of such engines it has been found that the gear shift lever or levers which are pivotally mounted on a stationary point in the driver's cab, as well as the long control rod connecting such gear shift lever with the gear shift mechanism on the transmission at the rear of the vehicle are dangerously affected by such vibrations and shocks since such control rod, being of a fixed length, is incapable of compensating or balancing the movements of the engine and transmission unit, and especially those movements which are exerted in the direction of the control rod leading to the gear shift lever. The least result to be expected of such movements is a disengagement of the gear shift mechanism from the particular selected position so that the gears will shift of their own accord from one speed to another or to an intermediate position.

It is the principal object of the present invention to provide a very simple device for eliminating such dangerous influence of the vibrations and shocks of the engine and transmission unit upon the gear shifting mechanism which may, for example, in mountainous terrain and when driving down a hill result in serious accidents.

A feature of the invention for carrying out such object consists in the provision of a bracing element between a stationary part of the vehicle and the resiliently suspended transmission or the unit combining the engine with the transmission; further, in mounting such element in the immediate vicinity of the control rod connecting the gear shift lever in the driver's cab with the gear shift mechanism on the transmission; and in extending such bracing element in a direction substantially parallel with that of such control or connecting rod.

The inventive advantage of such a bracing structure is that the shocks and vibrations which are caused by the driving shaft and are of a strength largely depending upon the resilience of the driving axle are checked or arrested without impairment of the suspension supporting the transmission so that the distance from the point where the control rod is pivotally mounted on the gear shift lever in the driver's cab, to the point in the back of the bus where the control rod is connected to the transmission will not change at any time.

Another feature of the invention consists in providing a bracing element in the form of a rod, one end of which is mounted on the frame of the vehicle and the other end on the transmission or the engine-transmission unit with rubber cushions being interposed at each end so as further to reduce the noise and vibrations which might otherwise be transmitted to the vehicle body.

Further objects, features, and advantages of the present invention will appear from the following detailed description thereof and the accompanying drawings, wherein—

Fig. 1 shows a side view of a bus with an engine-transmission unit mounted at the rear of the vehicle; while Fig. 2 is an enlarged detail view of a bracing element according to the invention.

Referring to the drawings, the engine block 5 of the bus 1 including the gear transmission 6 is preferably resiliently suspended at the points 3 and 4 in the back 2 of the bus, while the gear shift lever 9 is pivotally mounted in the driver's cab 7 at a stationary point 8 and connected by a control rod 10 with the customary mechanism for shifting the various gears of the transmission 6. As indicated particularly in Fig. 2, such gear shift mechanism may comprise a gate 11 with the shift positions 12, 12', and 12''.

In order to fix the location and mount the engine block 5 including the transmission 6 in the direction of the control rod 10 and relative to the movements of the engine-transmission block as well as the shocks transmitted from the rear axle 15 through the drive shaft 16, the transmission 6 is braced against a stationary part 13 of the vehicle, for example, a mounting element or one of the cross arms of the bus frame itself, by means of a bracing or suspension element 14 which is advantageously in the form of a rod and which is located closely adjacent to the control rod 10 of the gear shift mechanism and extends parallel therewith.

As shown particularly in Fig. 2, this bracing element 14 preferably consists of a rod which is essentially rigidly mounted by means of suitable mounting elements 13 and 19 at one end on a stationary body part of the bus and on the other end on the gear casing 6 itself. In order to avoid any direct metallic connection between the bracing element 14 and the mounting elements 13 and 19 of the stationary body part and the transmission 6, respectively, and to provide for an adequate resilience of the bracing structure rubber cushions or washers 17 and 18 may be provided intermediate the bracing element 14 and its mounting elements 13 and 19 at the opposite ends of bracing element 14. The elasticity of the cushions 17 and 18 is smaller in the direction of movement of control rod 10 than the elasticity of the elastic suspension at points 3 and 4.

Although my invention has been illustrated and described with reference to the preferred embodiments thereof I wish to have it understood that it is in no way limited to the details of such embodiments or to the specific examples described, but is capable of numerous modifications within the scope of the appended claim.

Having thus fully disclosed my invention, what I claim is:

In a motor vehicle, especially a vehicle of considerable length, such as a bus, having a front and a rear axle of rigid construction and comprising a body or chassis, a motor, a gear transmission rigidly connected with said motor, said motor gear transmission assembly being arranged at the rear of said rear axle in a longitudinal direction of said vehicle and substantially above said rear axle, a drive shaft for drivingly connecting said gear transmission with said rear axle, said drive shaft being inclined downwardly toward the front of said vehicle, a gear shifting mechanism, means for supporting said gear shifting mechanism on said gear transmission and means for resiliently mounting said motor-gear transmission assembly on said body to enable movement thereof about a longitudinal axis of the vehicle, a member mounted to said body in front of said front axle for operating said shifting mechanism, means for connecting said operating member with said shifting mechanism, a single bracing means disposed adjacent to said connecting means and arranged between said body and said supporting means, means for securing said bracing means on said body, and means for securing said bracing means on said supporting means, said bracing means extending between said two securing means in a direction substantially parallel to the direction of movement of said connecting means to thereby render said bracing means effective to maintain a constant distance between the points of connection of said connecting means with said operating member and with said shifting mechanism.

References Cited in the file of this patent

UNITED STATES PATENTS

| | | |
|---|---|---|
| 1,903,694 | Burney | Apr. 11, 1933 |
| 2,000,360 | Stout | May 7, 1935 |
| 2,092,040 | Aitken | Sept. 7, 1937 |
| 2,164,096 | Tjaarda | June 27, 1939 |
| 2,322,477 | Sjoberg | June 22, 1943 |